United States Patent [19]
Nishikawa et al.

[11] Patent Number: 5,578,538
[45] Date of Patent: Nov. 26, 1996

[54] CASTABLE REFRACTORY MATERIAL

[75] Inventors: Chiharu Nishikawa; Jun Ohba, both of Kitakyushu, Japan

[73] Assignee: Taiko Refractories Co., Ltd., Fukuoka-ken, Japan

[21] Appl. No.: 445,378

[22] Filed: May 19, 1995

[30] Foreign Application Priority Data

Jun. 8, 1994 [JP] Japan .................................. 6-151462

[51] Int. Cl.$^6$ .................................................. C04B 35/10
[52] U.S. Cl. ........................... 501/124; 106/692; 501/94; 501/128
[58] Field of Search ............................ 106/692; 501/124, 501/94, 128

[56] References Cited

U.S. PATENT DOCUMENTS

| | | | |
|---|---|---|---|
| 3,060,043 | 10/1962 | Renkey | 501/124 |
| 3,253,936 | 5/1966 | Weindel | 501/124 |
| 4,506,023 | 3/1985 | Guigonis | 501/124 |
| 4,680,279 | 7/1987 | Kleeb | 501/124 |
| 4,751,204 | 6/1988 | Kyoden et al. | 501/124 |
| 4,762,811 | 8/1988 | Vayda et al. | 501/124 |
| 4,943,544 | 7/1990 | McGarry et al. | 501/124 |
| 4,992,397 | 2/1991 | Hughes, Jr. | 501/124 |
| 5,420,087 | 5/1995 | Wieland et al. | 501/124 |

FOREIGN PATENT DOCUMENTS

| | | | |
|---|---|---|---|
| 0425086 | 5/1991 | European Pat. Off. | |
| 2578536 | 9/1986 | France | |
| 59-227762 | 12/1984 | Japan | 106/692 |
| 60-065770 | 4/1985 | Japan | 106/692 |
| 2023566 | 1/1980 | United Kingdom | |
| 2166130 | 4/1986 | United Kingdom | 501/124 |

*Primary Examiner*—Anthony Green
*Attorney, Agent, or Firm*—Sughrue, Mion, Zinn, Macpeak & Seas

[57] ABSTRACT

The castable refractory material comprising as binders, per 100 parts by weight of solid components, (a) 10–30 parts by weight of water-inactive, fine refractory powder, which is a mixture of fine refractory powder having an average diameter of 0.2–0.6 μm and fine refractory powder having an average diameter of 1–10 μm at a ratio of 1:2–2:1; (b) 2–7 parts by weight (as an effective amount) of alumina cement having an average diameter of 3–8 μm, cement clinker minerals thereof comprising $CaO.Al_2O_3$ and $CaO.2Al_2O_3$, with $12CaO.7Al_2O_3$, if any, in such an amount that a diffraction intensity index of the $12CaO.7Al_2O_3$ at a lattice plane distance D of 2.68 Å is 1 or less assuming that the diffraction intensity index of the $CaO.Al_2O_3$ at a lattice plane distance D of 2.96 Å is 100; and (c) 0.4–3 parts by weight of fine amorphous silica powder having an average diameter of 0.5 μm or less; the balance of the solid components being substantially refractory aggregate and refractory powder.

8 Claims, 1 Drawing Sheet

MIXING RATIO OF ALUMINA CEMENTS A AND B

CASTABLE REFRACTORY MATERIAL

BACKGROUND OF THE INVENTION

The present invention relates to a castable refractory material mainly used for linings of vessels such as tundishes and ladles for molten steel, etc.

Refractories are damaged mainly by melting and peeling. With respect to the melting, the castable refractory material can be provided with an improved resistance to the melting by using highly pure starting materials or by using fine powder serving to make the structures of the refractory concretes denser. However, no effective solutions have been found yet to the peeling of linings from ladles for molten steel, etc., due to mechanical spalling. The term "mechanical spalling" used herein means, for instance, cracking or peeling caused by mechanical impact to remove slag, metals or coating materials, etc., attached to the surfaces of the tundishes, etc., after casting. In addition, the linings are subjected to thermal expansion during operations, but they are restrained by outside iron shells. Accordingly, stress is likely to be generated in the refractory linings, causing the peeling of the refractory linings. Particularly, since there is a temperature gradient in the refractory linings of the melt vessels from the inner surfaces to the outer surfaces, peeling is likely to take place due to stress concentration in a region which is subjected to a temperature at which the strength of the lining materials is drastically decreased.

It may be contemplated to prevent the peeling of linings by increasing the strength of the lining materials. However, since the castable refractory material is not burned before casting, unlike refractory bricks, ceramic bonding cannot be relied on as a force to prevent the peeling.

Japanese Patent Laid-Open No. 54-113617 discloses a high-strength, unshaped refractory material comprising a refractory material based on alumina-silica, 0.5–12 weight % of an alumina cement containing 70% or more of alumina, and 1.0–8.0 weight % of fine amorphous silica flour having an apparent average diameter of 3 μm or less, based on the total amount thereof. In this refractory material, the silica flour and the alumina cement are used to achieve high strength. However, sufficient strength cannot be achieved at a low temperature unless the silica flour and the alumina cement are added in such large amounts as to damage the corrosion resistance.

Japanese Patent Laid-Open No. 57-172181 discloses a castable refractory material for linings of vessels for molten metals containing 0.5–4.0 weight % of refractory clay and 0.5–2.0 weight % of ultra-fine silica flour having an average diameter of at least 0.1 μm, based on the total amount thereof. In this refractory material, silica flour and alumina cement are used in desired amounts from the viewpoint of corrosion resistance. However, sufficient strength cannot be achieved yet.

Large amounts of alumina cement, etc., are used to achieve high strength in these references. This is due to the fact that sufficient consideration has not been made on the properties of alumina cement and the particle size distribution of binder-constituting materials, particularly fine refractory powder of alumina, etc.

Apart from the above, it is known that various fine refractory powders are added to increase a packing density, thereby improving physical strength. For instance, Japanese Patent Publication No. 58-33195 discloses a castable refractory material comprising a refractory material containing 5–30 weight % of ultra-fine powder having a particle size of 10 μm or less without binder clay, a dispersant and an agglomeration agent such as gelatin, casein, vegetable rubber, cellulose paste, PVA, etc., the refractory material being one or more selected from the group consisting of oxides, carbides, nitrides, silicides, borides and carbonaceous materials. The oxides include alumina, magnesia, silica, etc. However, this reference fails to teach that refractory powder having different sizes should be added to castable refractory materials to achieve high strength.

To withstand a mechanical impact from outside and a stress caused by thermal expansion, it is preferable that the refractory concretes have a modulus of rupture of 120 kgf/cm$^2$ or more and a crushing strength of 700 kgf/cm$^2$ or more at a temperature of 110° C. or higher.

OBJECT AND SUMMARY OF THE INVENTION

An object of the present invention is to provide a castable refractory material having excellent corrosion resistance and which is capable of showing strength to such a level as to withstand mechanical spalling, etc.

Thus, the castable refractory material of the present invention comprises as binders for exhibiting strength, per 100 parts by weight of solid components:

(a) 10–30 parts by weight of fine refractory powder inactive to water, the fine refractory powder being a mixture of fine refractory powder having an average diameter of 0.2–0.6 μm and fine refractory powder having an average diameter of 1–10 μm at a mixing ratio of 1:2–2:1;

(b) 2–7 parts by weight (as an effective amount) of alumina cement having an average diameter of 3–8 μm, cement clinker minerals of the alumina cement comprising $CaO.Al_2O_3$ and $CaO.2Al_2O_3$, with $12CaO.7Al_2O_3$, if any, in such an amount that a diffraction intensity index of the $12CaO.7Al_2O_3$ at a lattice plane distance D of 2.68 Å is 1 or less, assuming that the diffraction intensity index of the $CaO.Al_2O_3$ at a lattice plane distance D of 2.96 Å is 100; and (c) 0.4–3 parts by weight of fine amorphous silica powder having an average diameter of 0.5 μm or less;

the balance of the solid components being substantially refractory aggregate and refractory powder.

DETAILED DESCRIPTION OF THE INVENTION

Figure 1:
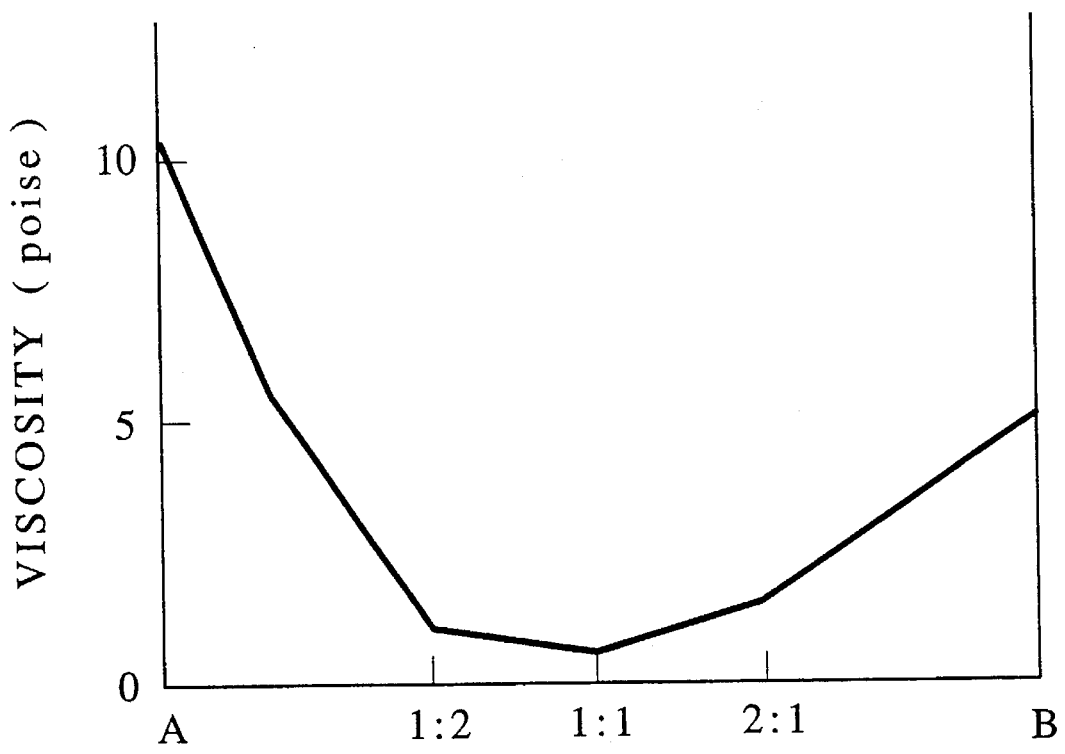
FIG. 1 is a graph showing the relation between the mixing ratio of fine alumina powder having different sizes and flowability expressed by viscosity.

In the castable refractory material of the present invention, the binders for exhibiting high strength comprise fine refractory powders inactive to water (hereinafter referred to as "water-inactive, fine refractory powder"), alumina cement and fine amorphous silica powder, and the remaining solid components are substantially refractory aggregate and refractory powder. A detailed description will be made on each component.

[1] Water-inactive, fine refractory powder

To increase the strength of the refractory concretes, water-inactive, fine refractory powders are required as materials mainly constituting the binders to provide as dense a refractory concrete structure as possible. A typical example of such water-inactive, fine refractory powder is alumina, and the fine refractory powder of alumina has a particle size which differs stepwise depending on the production stages thereof. Accordingly, to make the filling or packing structure of the refractory concrete dense, fine refractory powder of different sizes should be combined at appropriate proportions, because fine refractory powder of a single size fails to provide a sufficiently dense structure to the refractory concrete. Here, the term "single size" means that the particle size distribution of the fine refractory powder used has a single sharp peak, and the term "different sizes" means that the particle size distribution of the fine refractory powder used has two or more separate peaks.

The first important feature of the present invention is that the fine refractory powder used should be a mixture of fine refractory powder having an average diameter of 0.2–0.6 μm and fine refractory powder having an average diameter of 1–10 μm at a mixing ratio of 1:2–2:1.

When the average diameter of the fine refractory powder is more than 10 μm, the fine refractory powder hardly contributes to an increase in the strength of the refractory concretes. On the other hand, when the average diameter of the fine refractory powder is less than 0.2 μm, the agglomeration of the fine refractory powder becomes larger, failing to achieve sufficient dispersion and thus strength. Since the lower limit (1 μm) of the average diameter of the larger refractory powder is sufficiently larger than the upper limit (0.6 μm) of the average diameter of the smaller refractory powder, the smaller refractory powder is well dispersed in gaps between the larger refractory powder. This is considered to contribute to the high densities of the refractory concretes produced from the castable refractory material of the present invention.

With respect to the mixing ratio of 1:2–2:1, its criticality is proved by experiments shown in FIG. 1, which shows a viscosity of a mixture of fine alumina powder having an average diameter of 4 μm and fine alumina powder having an average diameter of 0.3 μm, the mixture further containing 0.3% (outer percentage) of sodium hexametaphosphate as a dispersant and 25% (outer percentage) of water. In FIG. 1, "A" denotes the fine alumina powder having an average diameter of 4 μm, and "B" denotes the fine alumina powder having an average diameter of 0.3 μm. It is evident from FIG. 1 that the viscosity of the mixture of the fine alumina powder of different sizes is minimum in a mixing ratio ranging from 2:1 to 1:2 with 1:1 at center. Also, when a suspension is prepared from the mixture of the fine alumina powder having different average diameters (diameter distributions), the suspension has a small sedimentation volume in this mixing ratio range, thereby providing the resultant refractory concrete with a well packed structure.

When the percentage of the water-inactive, fine refractory powder is less than 10 parts by weight, sufficient strength cannot be achieved in the resultant refractory concretes. On the other hand, when the percentage of the water-inactive, fine refractory powder exceeds 30 parts by weight, the percentage of the fine refractory powder becomes excessive, resulting in an undesirably increased porosity of the refractory concretes.

The water-inactive, fine refractory powder may be alumina, chromia, spinel, titania, etc., or mixtures thereof, which may be selected depending on applications. Alumina is preferable particularly in the case of the linings of vessels such as tundishes and ladles for steel melting which are required to have high corrosion resistance.

[2] Alumina cement

It is required that the alumina cement is uniformly dispersed in the densely packed water-inactive, fine refractory powder. After dispersion, the alumina cement is gradually dissolved and diffused in water to precipitate a hydrate thereof which fills gaps of the above-described packing structure, thereby making the refractory concretes exhibit such a strength that cannot be achieved with physical agglomeration which depends on the packing density of the fine refractory powder.

When the alumina cement has an average diameter of less than 3 μm, it is rapidly dissolved in water since it is extremely active to water, thereby not only consuming a dispersant in a short period of time, but also being hard to deflocculate in water due to high agglomeration force. On the other hand, when the average diameter of the alumina cement exceeds 8 μm, the amount of the alumina cement necessary for achieving sufficient strength increases, resulting in the deterioration of corrosion resistance.

The clinker minerals of the alumina cement generally include $CaO \cdot Al_2O_3$, $CaO \cdot 2Al_2O_3$ and $12CaO \cdot 7Al_2O_3$. Since $12CaO \cdot 7Al_2O_3$ is active to water, it thereby prevents the uniform dispersion of the alumina cements. If the alumina cement including $C_{12}A_7$ is used, a large amount of alumina cement is necessary to achieve high strength because of forming secondary particles of cement powder. In addition, the secondary particles tend to form voids in the refractory concretes after drying and heating, they thus decrease the strength of the refractory concretes in a temperature range lower than a temperature at which ceramic bonding takes place. As a result, the resultant refractory concretes suffer from peeling.

Accordingly, the alumina cement should not contain $12CaO \cdot 7Al_2O_3$, or the amount of $12CaO \cdot 7Al_2O_3$, if any, should be as small as possible. The determination of the amount of $12CaO \cdot 7Al_2O_3$ is carried out by powder X-ray diffractometry, and the diffraction intensity index of a main peak (lattice plane distance D=2.68 Å) of $12CaO \cdot 7Al_2O_3$ should be 1 or less, assuming that the diffraction intensity index of a main peak (lattice plane distance D=2.96 Å) of $CaO \cdot Al_2O_3$ is 100. Also, the CaO content in the alumina cement is desirably 25 weight % or less, and more desirably 10–25 weight %.

Commercially available high-grade alumina cement usually contains free $\alpha$-$Al_2O_3$ in addition to cement minerals (cement clinker minerals). Therefore, the CaO content in the high-grade alumina cement varies depending on the mineral composition of the cement clinker and free $\alpha$-$Al_2O_3$ content. Since the total amount of CaO derived from the cement used for the castable refractories has a great influence on the strength and corrosion resistance of the refractory concrete, it should be prescribed in a definite range. The effective amount ($W_{eff}$) of alumina cement required in the castable refractories is determined herein with respect to the alumina cement containing 25 weight % of CaO. As a result, it has been found that the effective amount of ($W_{eff}$) of alumina cement should be 2–7 parts by weight in the castable refractory material of the present invention. Assuming that the alumina cement (commercially available alumina cement) containing "X" weight % of CaO is used, the amount (W) of alumina cement can be calculated by the formula:

$$W = (25 \times W_{eff})/X$$

When the effective amount of the alumina cement is less than 2 parts by weight, sufficient strength cannot be achieved in the resultant refractory concretes. On the other hand, when the effective amount of the alumina cement is more than 7 parts by weight, the corrosion resistance of the resultant refractory concretes is deteriorated.

The alumina cement may contain up to 5 weight %, preferably less than 2 weight %, as a total amount based on the alumina cement, of impurities such as $Fe_2O_3$, $SiO_2$, $TiO_2$, etc.

[3] Fine amorphous silica powder

The fine amorphous silica powder having an average diameter of 0.5 μm or less can react with $Ca^{2+}$ ions dissolved from the alumina cement into water to form a gel hydrate of $CaO$—$SiO_2$—$H_2O$, etc., which are effective to achieve high bonding strength. Fine powder exhibiting bonding strength by such a chemical reaction is amorphous silica, while crystalline silica, chromia and alumina fail to exhibit such effects. Further, when the fine amorphous silica powder is substantially spherical, it can show a high packing density due to a bearing effect, thereby effectively improving strength. The preferred average diameter of the fine amorphous silica powder is 0.1–0.4 μm.

When the fine amorphous silica powder amount is less than 0.4 parts by weight, sufficient strength cannot be achieved in the resultant refractory concretes. On the other hand, when the fine amorphous silica powder amount is more than 3 parts by weight, the corrosion resistance of the resultant refractory concretes is deteriorated, and excessive sintering and thus excessive shrinkage take place at a high temperature of 1300° C. or higher, whereby the resultant refractory concretes suffer from poor resistance to thermal spalling. Also, the excessive shrinkage leads to the expansion of shrinkage cracks in an actual lining, thereby resulting in soaking of molten metal into shrinkage cracks, which leads to a decrease in service life of vessel linings. The preferred amount of the fine amorphous silica powder is 0.5–2.5 parts by weight.

[4] Refractory aggregate and refractory powder

The castable refractory material also comprises refractory aggregate and refractory powder. The refractory aggregate and refractory powder may be alumina, magnesia, spinel, chromia, bauxite, etc., or mixtures thereof.

[5] Other components

The castable refractory materials of the present invention may further contain set control additives, dispersants, plasticizers, reinforcing materials (steel fibers, etc.), materials resistant to steam spalling such as aluminum powder, organic fibers, etc.

The present invention will be explained more specifically by Examples and Comparative Examples below without intention of restricting the scope of the present invention defined in the claims attached hereto.

EXAMPLES 1–3

Comparative Examples 1–7

Five types of alumina cement A, B, C, D and E shown in Table 1 were mixed with refractory aggregate, fine alumina powder, amorphous silica powder, sodium hexametaphosphate and water in formulations as shown in Table 2, and each of the resultant mixtures was vibration-cast into a mold and cured. Each of the resultant refractory concretes was measured with respect to modulus of rapture, crushing strength and corrosion resistance. The corrosion resistance was determined from the amount of refractory concretes eroded (simply "erosion depth") at 1700° C. for 5 hours by using a slag for a steel melt ladle in a rotating erosion test. The test results of the refractory concretes are also shown in Table 2.

TABLE 1

| Type of Alumina Cement | A | B | C | D | E |
|---|---|---|---|---|---|
| Chemical Composition (weight %)[1] | | | | | |
| CaO | 24 | 25 | 24 | 24 | 18 |
| $Al_2O_3$ | 74 | 74 | 74 | 74 | 80 |
| $Fe_2O_3$ | 0.2 | 0.2 | 0.2 | 0.2 | 0.05 |
| $SiO_2$ | 0.3 | 0.4 | 0.3 | 0.3 | 0.05 |
| $TiO_2$ | 0.05 | 0.05 | 0.05 | 0.05 | tr[2] |
| Mineral Composition (weight %)[3] | | | | | |
| α-$Al_2O_3$ | 25 | 27 | 25 | 25 | 42 |
| $CaO\cdot Al_2O_3$ | 70 | 70 | 70 | 70 | 54 |
| $CaO\cdot 2Al_2O_3$ | 5 | —[4] | 5 | 5 | 4 |
| $12CaO\cdot 7Al_2O_3$ | —[4] | 3 | —[4] | —[4] | —[4] |
| Diffraction Intensity Index | | | | | |
| $CaO\cdot 2Al_2O_3$[5] | 32 | 0 | 32 | 32 | 25 |
| $12CaO\cdot 7Al_2O_3$[6] | 0 | 2 | 0 | 0 | 0 |
| Average Diameter (μm) | 5 | 5 | 2 | 10 | 5 |

Note:
[1]The chemical composition of alumina cement expressed by weight %, based on the total amount of the alumina cement.
[2]Trace amount.
[3]The mineral composition of alumina cement expressed by weight %, based on the total amount of the alumina cement.
[4]Not detected.
[5]Diffraction intensity index of a main peak of $CaO\cdot 2Al_2O_3$, assuming that the diffraction intensity index of a main peak of $CaO\cdot Al_2O_3$ is 100.
[6]Diffraction intensity index of a main peak of $12CaO\cdot 7Al_2O_3$, assuming that the diffraction intensity index of a main peak of $CaO\cdot Al_2O_3$ is 100.

TABLE 2

| | Example | | | Comparative Example | | | | | | |
|---|---|---|---|---|---|---|---|---|---|---|
| No. | 1 | 2 | 3 | 1 | 2 | 3 | 4 | 5 | 6 | 7 |
| Composition (parts by weight) | | | | | | | | | | |
| Alumina 6-1 mm[1] | 40 | 40 | 40 | 40 | 40 | 40 | 40 | 40 | 40 | 40 |
| Alumina 1-0 mm[2] | 30 | 30 | 30 | 30 | 30 | 30 | 30 | 30 | 30 | 30 |
| Magnesia 1-0 mm[3] | 5 | 5 | 5 | 5 | 5 | 5 | 5 | 5 | 5 | 5 |
| Fine Alumina Powder | | | | | | | | | | |
| A[4] | 10 | 8 | 5 | 6 | 10 | 6 | 12 | 10 | 6 | 7 |
| B[5] | 10 | 10 | 10 | 10 | 10 | 10 | 10 | 10 | 10 | 10 |
| Alumina Cement | | | | | | | | | | |
| A | 4 | 6 | — | 8 | — | — | — | — | — | — |
| B | — | — | — | — | 4 | 8 | — | — | — | — |
| C | — | — | — | — | — | — | 4 | 8 | — | — |
| D | — | — | — | — | — | — | — | — | — | 7 |
| E | — | — | 9 | — | — | 2 | — | — | 2 | — |
| $W_{eff}$[6] | 3.84 | 5.76 | 6.48 | 7.68 | 3.84 | 7.68 | 1.44 | 3.84 | 7.68 | 6.72 |
| Amorphous Silica[7] | 1 | 1 | 1 | 1 | 1 | 1 | 1 | 1 | 1 | 1 |

TABLE 2-continued

|  | Example | | | Comparative Example | | | | | | |
|---|---|---|---|---|---|---|---|---|---|---|
| No. | 1 | 2 | 3 | 1 | 2 | 3 | 4 | 5 | 6 | 7 |
| $(NaPO_3)_6$ [8] | 0.1 | 0.1 | 0.1 | 0.1 | 0.1 | 0.1 | 0.1 | 0.1 | 0.1 | 0.1 |
| Water[9] | 5.0 | 5.0 | 5.2 | 5.3 | 5.1 | 5.3 | 4.9 | 5.4 | 5.8 | 5.5 |
| Properties of Refractory Concretes | | | | | | | | | | |
| Modulus of Rapture[10] | | | | | | | | | | |
| at 110° C. | 150 | 155 | 165 | 170 | 60 | 110 | 40 | 60 | 90 | 80 |
| at 700° C. | 155 | 160 | 162 | 160 | 38 | 65 | 30 | 40 | 60 | 85 |
| at 1000° C. | 170 | 175 | 180 | 185 | 105 | 130 | 70 | 60 | 90 | 135 |
| Crushing Strength[10] | | | | | | | | | | |
| at 110° C. | 750 | 775 | 800 | 835 | 380 | 465 | 290 | 395 | 480 | 465 |
| at 700° C. | 945 | 950 | 955 | 960 | 395 | 490 | 350 | 355 | 410 | 490 |
| at 1000° C. | 1050 | 1065 | 1080 | 1085 | 585 | 680 | 425 | 450 | 505 | 695 |
| Erosion Depth (mm) | 8 | 9 | 10 | 21 | 14 | 24 | 14 | 14 | 27 | 17 |

Note:
[1] Aggregate having a diameter ranging from 6 mm to 1 mm.
[2] Aggregate having a diameter ranging from 1 mm to 0 mm.
[3] Aggregate having a diameter ranging from 1 mm to 0 mm.
[4] Average diameter = 4 μm.
[5] Average diameter = 0.3 μm.
[6] Effective amount of alumina cement expressed by the following formula:
$$W_{eff} = \frac{X}{25} \cdot W,$$
wherein $W_{eff}$: effective amount of alumina cement,
W: total amount of alumina cement, and
X: CaO content (weight %).
[7] Amorphous silica powder having an average diameter of 0.3 μm.
[8] Sodium hexametaphosphate (outer percentage).
[9] Outer percentage.
[10] Unit: kgf/cm².

Comments on each Comparative Example are as follows.

Com. Ex. 1 Large amount of cement, poor corrosion resistance.

Com. Ex. 2 Containing 12CaO.7Al₂O₃, poor strength.

Com. Ex. 3 Large amount of cement.

Com. Ex. 4 Low value of $W_{eff}$, poor strength.

Com. Ex. 5 Fine cement powder, poor strength.

Com. Ex. 6 Large amount of cement.

Com. Ex. 7 Coarse cement powder, poor strength.

The refractory concretes of Examples 1 and 2 containing alumina cement A (average diameter: 4 μm) had a high strength and an excellent corrosion resistance. On the other hand, the refractory concrete of Comparative Example 1 to which an excessive amount ($W_{eff}$: more than 7) of alumina cement was added suffered from the deterioration of corrosion resistance. The refractory concretes of Comparative Examples 2 and 3 containing alumina cement B having a large 12CaO.7Al₂O₃ content failed to show sufficient strength. The refractory concrete of Example 3 containing 9 parts by weight of alumina cement E (average diameter: 4 μm) also had an excellent corrosion resistance, because of the $W_{eff}$ value between 2 and 7.

The refractory concrete of Comparative Example 4 failed to show sufficient strength, because of the $W_{eff}$ value less than 2. The refractory concretes of Comparative Examples 5 and 6 containing alumina cement C having a small average diameter (2 μm) and the refractory concrete of Comparative Example 7 containing alumina cement D having a large average diameter (10 μm) also failed to show sufficient strength.

EXAMPLES 4–7

Comparative Examples 8–12

With the proportions of fine alumina powder having different sizes and the fine amorphous silica powder changed, refractory concretes were prepared in the same manner as in Example 1. The formulations and test results of modulus of rapture, crushing strength and permanent linear change by thermal expansion are shown in Table 3.

TABLE 3

|  | Example | | | | Comparative Example | | | | |
|---|---|---|---|---|---|---|---|---|---|
| No. | 4 | 5 | 6 | 7 | 8 | 9 | 10 | 11 | 12 |
| Composition (parts by weight) | | | | | | | | | |
| Alumina 6–1 mm[1] | 40 | 40 | 40 | 40 | 40 | 40 | 40 | 40 | 40 |
| Alumina 1–0 mm[2] | 44.5 | 30 | 30 | 20.5 | 39.5 | 15.5 | 30 | 30 | 30 |
| Magnesia 1–0 mm[3] | 5 | 5 | 5 | 5 | 5 | 5 | 5 | 5 | 5 |
| Fine Alumina Powder | | | | | | | | | |
| A[4] | 5 | 7.5 | 13.5 | 15 | 3 | 15 | 0 | 20 | 10 |

TABLE 3-continued

|  | Example | | | | Comparative Example | | | | |
| --- | --- | --- | --- | --- | --- | --- | --- | --- | --- |
| No. | 4 | 5 | 6 | 7 | 8 | 9 | 10 | 11 | 12 |
| B[5] | 5 | 13 | 7.5 | 15 | 3 | 20 | 20 | 0 | 10 |
| Alumina Cement A | 7 | 2 | 2 | 2 | 7 | 2 | 5 | 5 | 2 |
| Amorphous Silica[6] | 2.5 | 2.5 | 2.5 | 2.5 | 2.5 | 2.5 | 1 | 1 | 4 |
| $(NaPO_3)_6$[7] | 0.1 | 0.1 | 0.1 | 0.1 | 0.1 | 0.1 | 0.1 | 0.1 | 0.1 |
| Water[8] | 4.9 | 4.8 | 4.8 | 5.3 | 5.0 | 6.0 | 6.0 | 6.2 | 4.6 |
| Properties of Refractory Concretes | | | | | | | | | |
| Modulus of Rapture[9] | | | | | | | | | |
| at 110° C. | 125 | 135 | 130 | 145 | 90 | 80 | 60 | 70 | 145 |
| at 700° C. | 120 | 135 | 135 | 150 | 85 | 70 | 55 | 65 | 140 |
| at 1000° C. | 140 | 155 | 150 | 160 | 120 | 125 | 115 | 135 | 175 |
| Crushing Strength[9] | | | | | | | | | |
| at 110° C. | 675 | 705 | 690 | 720 | 490 | 455 | 425 | 430 | 730 |
| at 700° C. | 685 | 720 | 710 | 745 | 510 | 485 | 420 | 460 | 730 |
| at 1000° C. | 720 | 790 | 780 | 805 | 530 | 505 | 495 | 625 | 970 |
| Permanent Linear Change (%)[10] | −0.2 | −0.2 | −0.2 | −0.1 | −0.2 | −0.2 | +0.1 | +0.3 | −0.8 |

Note:
(1)–(5): Same as (1)–(5) in Table 2.
(6)–(9): Same as (7)–(10) in Table 2.
(10): Permanent linear change by heating at 1500° C. for 3 hrs.

Comments on each Comparative Example are as follows.

Com. Ex. 8 Small amount of fine alumina powder; poor strength.

Com. Ex. 9 Large amount of fine alumina powder; poor strength.

Com. Ex. 10 Fine alumina powder A or B was used; poor strength.

Com. Ex. 11 Fine alumina powder A or B was used; poor strength.

Com. Ex. 12 Large shrinkage, soaking of molten metal.

The refractory concretes of Examples 4, 5, 6 and 7 showed high strength. However, the refractory concrete of Comparative Example 8, to which a small amount (6 parts by weight) of fine alumina powder was added, failed to achieve sufficient strength. Also, the refractory concrete of Comparative Example 9, to which a large amount (35 parts by weight) of fine alumina powder was added, failed to achieve sufficient strength, because of increase in the water amount required for good workability.

When fine alumina powder A and fine alumina powder B were added alone as in Comparative Examples 10 and 11, the amount of water added also increased, failing to achieve high strength. The refractory concrete of Comparative Example 12 containing a large amount of fine amorphous silica powder showed large shrinkage by heating at a high temperature. Thus, the refractory concrete of Comparative Example 12 suffered from cracks due to shrinkage, resulting in soaking of molten metal into the shrinkage cracks.

As described above, the castable refractory material of the present invention shows a high strength at a temperature of 110° C. or higher and does not suffer from a decrease in a strength at a high temperature up to 1300° C. Accordingly, it can withstand mechanical impact from outside and stress generated by thermal expansion. Thus, it can show a drastically improved resistance to damage due to peeling.

What is claimed is:

1. A castable refractory material comprising as binders for exhibiting high strength, per 100 parts by weight of solid components:

(a) 10–30 parts by weight of fine refractory powder inactive to water and selected from the group consisting of alumina, chromia, spinel, titania and mixtures thereof, said fine refractory powder being a mixture of fine refractory powder having an average diameter of 0.2–0.6 μm and fine refractory powder having an average diameter of 1–10 μm at a mixing ratio of 1:2–2:1;

(b) 2–7 parts by weight (as an effective amount) of alumina cement having an average diameter of 3–8 μm, cement clinker minerals of said alumina cement comprising $CaO.Al_2O_3$, $CaO.2Al_2O_3$, and $12CaO.7Al_2O_3$, in such an amount that if said $12CaO.7Al_2O_3$ is present, a diffraction intensity index of said $12CaO.7Al_2O_3$ at a lattice plane distance D of 2.68 Å is 1 or less, assuming that the diffraction intensity index of said $CaO.Al_2O_3$ at a lattice plane distance D of 2.96 Å is 100; and (c) 0.4–3 parts by weight of fine amorphous silica powder having an average diameter of 0.5 μm or less;

the balance of said solid components being substantially refractory aggregate and refractory powder each selected from the group consisting of alumina, magnesia, spinel, chromia, bauxite and mixtures thereof, where the effective amount of alumina cement is defined by $W_{eff}$, where X is the amount of CaO and W is the amount of alumina cement:

$$W=(25 \times W_{eff})/X.$$

2. The castable refractory material according to claim 1, wherein said alumina cement contains 25 weight % or less of CaO.

3. The castable refractory material according to claim 1, wherein said fine amorphous silica powder is spherical.

4. The castable refractory material according to claim 1, containing no $12CaO.7Al_2O_3$.

5. The castable refractory material according to claim 2, containing no $12 CaO.7Al_2O_3$.

6. The castable refractory material according to claim 3, containing no 12 CaO.7Al$_2$O$_3$.

7. The castable refractory material according to claim 2, wherein said fine amorphous silica powder is spherical.

8. The castable refractory material according to claim 7, containing no 12 CaO.7Al$_2$O$_3$.

* * * * *